United States Patent
Bizzarro

(10) Patent No.: US 9,764,846 B2
(45) Date of Patent: Sep. 19, 2017

(54) CONTAMINATION FREE REVERSE FLOW FITTING

(71) Applicant: Hamilton Sundstrand Corporation, Windsor Locks, CT (US)

(72) Inventor: Peter Bizzarro, Canton, CT (US)

(73) Assignee: HAMILTON SUNDSTRAND CORPORATION, Windor Locks, CT (US)

( * ) Notice: Subject to any disclaimer, the term of this patent is extended or adjusted under 35 U.S.C. 154(b) by 861 days.

(21) Appl. No.: 13/856,162

(22) Filed: Apr. 3, 2013

(65) Prior Publication Data
US 2014/0298823 A1    Oct. 9, 2014

(51) Int. Cl.
| | | |
|---|---|---|
| B64D 13/08 | (2006.01) | |
| F02C 6/08 | (2006.01) | |
| F02C 7/143 | (2006.01) | |
| F28F 9/02 | (2006.01) | |
| F28F 19/00 | (2006.01) | |
| B64D 13/06 | (2006.01) | |
| F28D 21/00 | (2006.01) | |

(52) U.S. Cl.
CPC .............. *B64D 13/08* (2013.01); *F02C 6/08* (2013.01); *F02C 7/143* (2013.01); *F28D 21/0001* (2013.01); *F28F 9/02* (2013.01); *F28F 19/00* (2013.01); *B64D 2013/0651* (2013.01); *F28D 2021/0021* (2013.01); *F28F 2250/06* (2013.01); *Y02T 50/675* (2013.01)

(58) Field of Classification Search
CPC .............................. B64D 13/06; B64D 13/08; B64D 2013/0603; F02C 6/08; F02C 7/185
See application file for complete search history.

(56) References Cited

U.S. PATENT DOCUMENTS

| | | | | |
|---|---|---|---|---|
| 2,557,101 A | * | 6/1951 | Mayer .................... | B64D 13/08 417/408 |
| 5,137,230 A | * | 8/1992 | Coffinberry ............. | B64C 21/06 244/118.5 |
| 2008/0230651 A1 | | 9/2008 | Porte | |

OTHER PUBLICATIONS

European Search Report regarding related EP App. No. 14162765.3; dated Nov. 18, 2014; 4 pgs.

* cited by examiner

*Primary Examiner* — Ehud Gartenberg
*Assistant Examiner* — Thomas Burke
(74) *Attorney, Agent, or Firm* — Cantor Colburn LLP

(57) ABSTRACT

A precooler for an aircraft engine system includes a precooler core and a precooler inlet to direct a compressor bleed flow into the precooler core to cool the compressor bleed flow. The precooler further includes a precooler outlet to direct the compressor bleed flow from the precooler to a selected component of the aircraft engine system and a precooler bleed port through which a portion of the compressor bleed flow is diverted to a secondary component of the aircraft engine system. The precooler bleed port is oriented such that flow entering the precooler bleed port must substantially reverse direction from a direction of the compressor bleed flow through the precooler.

18 Claims, 6 Drawing Sheets

CONTAMINATION FREE REVERSE FLOW FITTING

BACKGROUND

The subject matter disclosed herein generally relates to bleed air flow from an aircraft engine. More specifically, the disclosure relates to filtration of bleed air flow from an aircraft engine.

In an engine system for, for example, an aircraft, airflow supplied to an environmental control system (ECS) is bled or tapped from the engine compressor or core. In many instances, the bleed air is contaminated with oil, dust particles or other debris or contaminants from the aircraft engine. This high pressure airflow is passed through a heat exchanger, also referred to as a precooler, to cool the airflow. A portion of the airflow is routed from the precooler to the ECS, while a portion is tapped off of the precooler at a precooler bleed outlet to supply pressurized airflow to a fan air torque motor. The air passage to the fan air torque motor includes a filter to prevent contaminants from entering small passages in the fan air torque motor and torque motor controller in an attempt to extend the useful service life of the fan air torque motor and controller. Over time, however, the filter becomes clogged requiring removal and cleaning or replacement of the filter.

BRIEF DESCRIPTION

According to one embodiment, a precooler for an aircraft engine system includes a precooler core and a precooler inlet to direct a compressor bleed flow into the precooler core to cool the compressor bleed flow. The precooler further includes a precooler outlet to direct the compressor bleed flow from the precooler to a selected component of the aircraft engine system and a precooler bleed port through which a portion of the compressor bleed flow is diverted to a secondary component of the aircraft engine system. The precooler bleed port is oriented such that flow entering the oriented such that flow entering the precooler bleed port must substantially reverse direction from a direction of the compressor bleed flow through the precooler.

According to another embodiment, an aircraft engine system includes a compressor and a compressor bleed port to allow for extraction of a compressor bleed flow from the compressor. A precooler is operably connected to the compressor including a precooler core and a precooler inlet to direct a compressor bleed flow into the precooler core to cool the compressor bleed flow. The precooler further includes a precooler outlet to direct the compressor bleed flow from the precooler to a selected component of the aircraft engine system and a precooler bleed port through which a portion of the compressor bleed flow is diverted to a secondary component of the aircraft engine system. The precooler bleed port is oriented such that flow entering the precooler bleed port must substantially reverse direction from a direction of the compressor bleed flow through the precooler.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
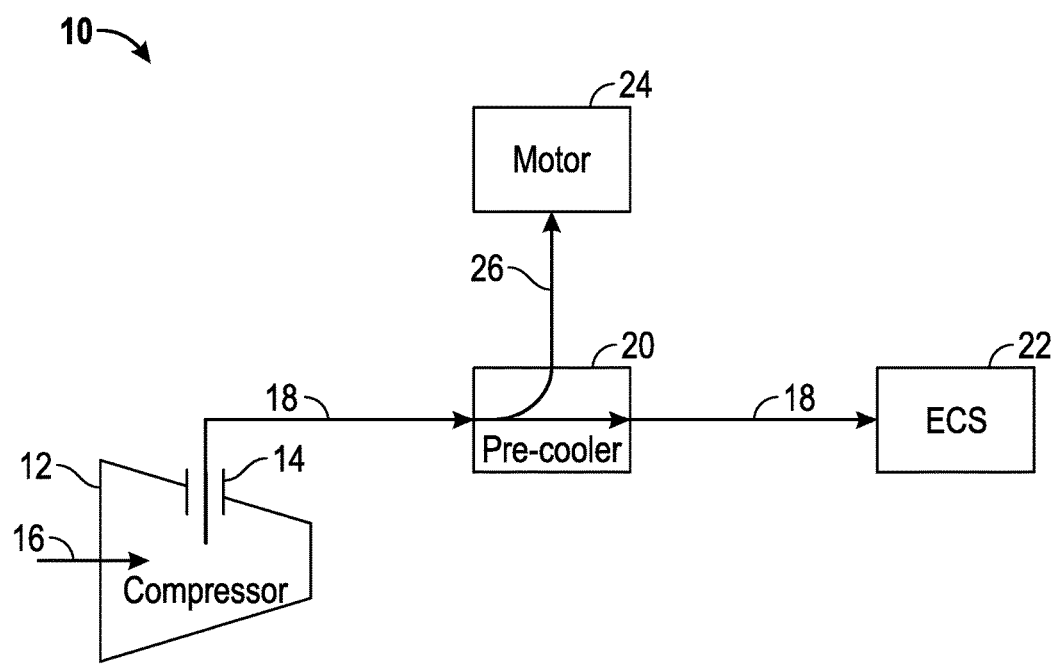
FIG. 1 is schematic view of an embodiment of an aircraft engine system.

Shown in FIG. 1 is a schematic of an angine system 10, for example, an aircraft engine system. The engine system 10 includes a compressor 12 having a compressor bleed outlet 14, through which a portion of a compressor airflow 16, referred to as compressor bleed flow 18, through the compressor 12 may be flowed. In some embodiments, flow through the compressor bleed outlet is controlled by a compressor bleed valve (not shown). The compressor bleed flow 18 is routed through a heat exchanger, precooler 20, to cool the compressor bleed flow 18, and then flowed out of the precooler 20 to an intended component, such as environmental control system (ECS) 22. A portion of the compressor bleed flow 18 is diverted from the precooler 20 to a secondary component, such as a fan air torque motor 24, as precooler bleed flow 26.

Figure 2:
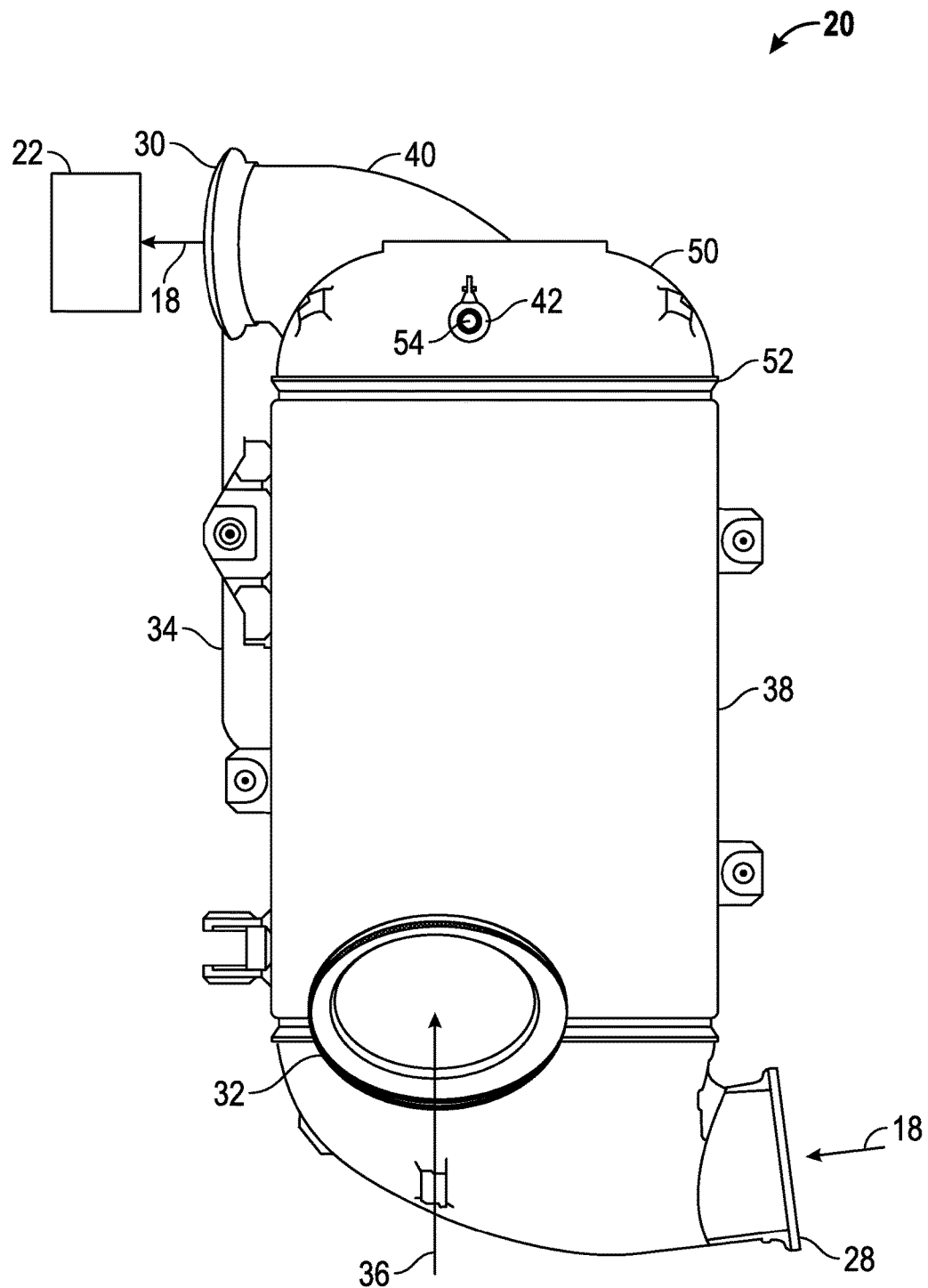
FIG. 2 is a perspective view of an embodiment of a precooler for a aircraft engine system.

Referring now to FIG. 2, the precooler 20 includes a first inlet 28 and a first outlet 30, through which the compressor bleed flow 18 flows into and out of the precooler 20, respectively. Compressor bleed flow 18 flowing out of the first outlet 30 flows toward the engine control system 22. The precooler 20 also includes a second inlet 32 and second outlet 34 through which a heat exchange medium 36, for example an airflow with a temperature lower than the compressor bleed flow 18, enters and exits the precooler 20. In a precooler core 38, thermal energy is transferred between the heat exchange medium 36 and the compressor bleed flow 18 to cool the compressor bleed flow 18. The cooled compressor bleed flow 18 then proceeds through the first outlet 30 via a precooler outlet duct 40 toward the ECS 22.

Figure 3:
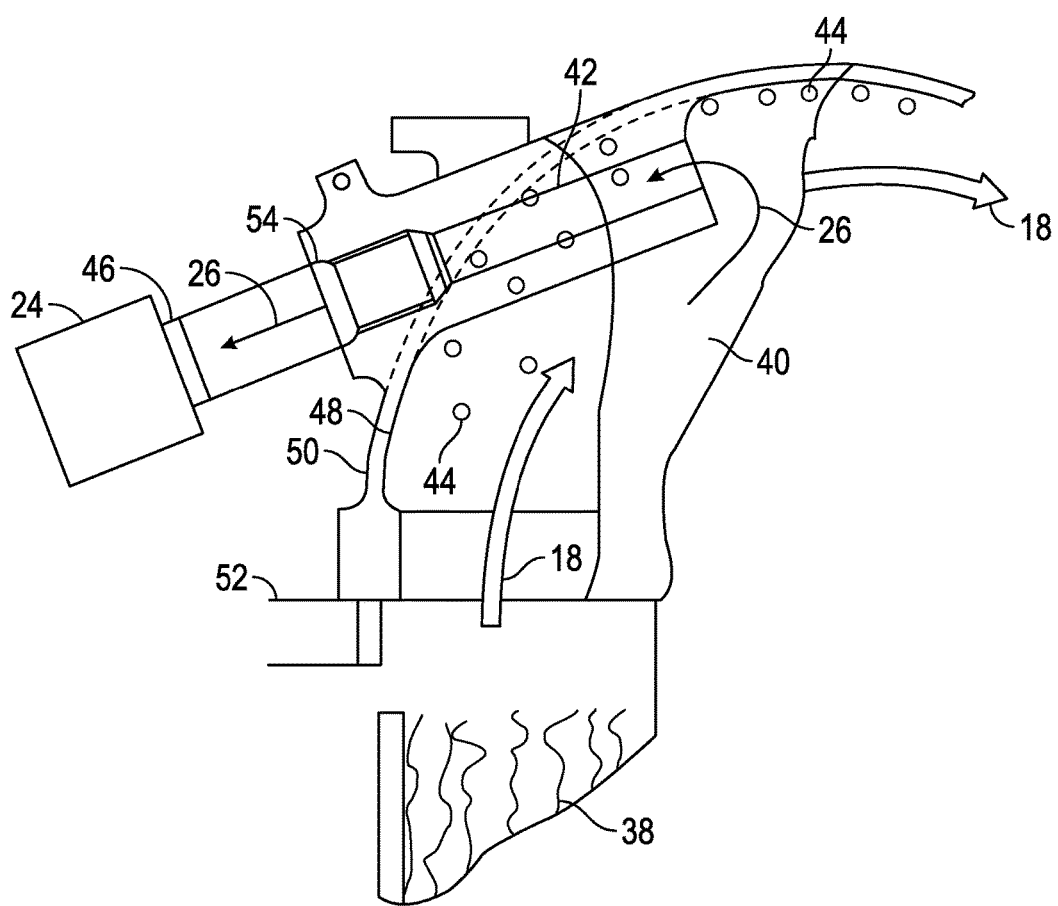
FIG. 3 is a partial cross-sectional view of an embodiment of a precooler.

Referring to FIG. 3, the precooler bleed flow 26 is diverted from the precooler 20 through a precooler bleed port 42. Flow is urged through the precooler bleed port 42 by a pressure differential between the relatively high pressure precooler 20 and the relatively low pressure fan air torque motor 24. The precooler bleed port 42 is oriented such that to enter the precooler bleed port 42, the precooler bleed flow 26 must substantially reverse direction from a direction of the compressor bleed flow 18 through the precooler outlet duct 40. In some embodiments, a direction of flow of the precooler bleed flow 26 into the precooler bleed port 42 differs from a direction of flow of the compressor bleed flow 18 through the precooler outlet duct 40 by 180 degrees. By requiring the precooler bleed flow 26 to reverse direction from the compressor bleed flow 18 results in a reduction in contaminant particles 44 entering the precooler bleed port 42 and clogging a filter 46 for the fan air torque motor 24. A momentum of the contaminant particles 44 in the compressor bleed flow 18 causes the contaminant particles 44 to cling, or remain close, to an interior wall 48 of the precooler outlet duct 40, thus remaining with the compressor bleed flow 18, rather than entering the precooler bleed port 42.

Figure 4:
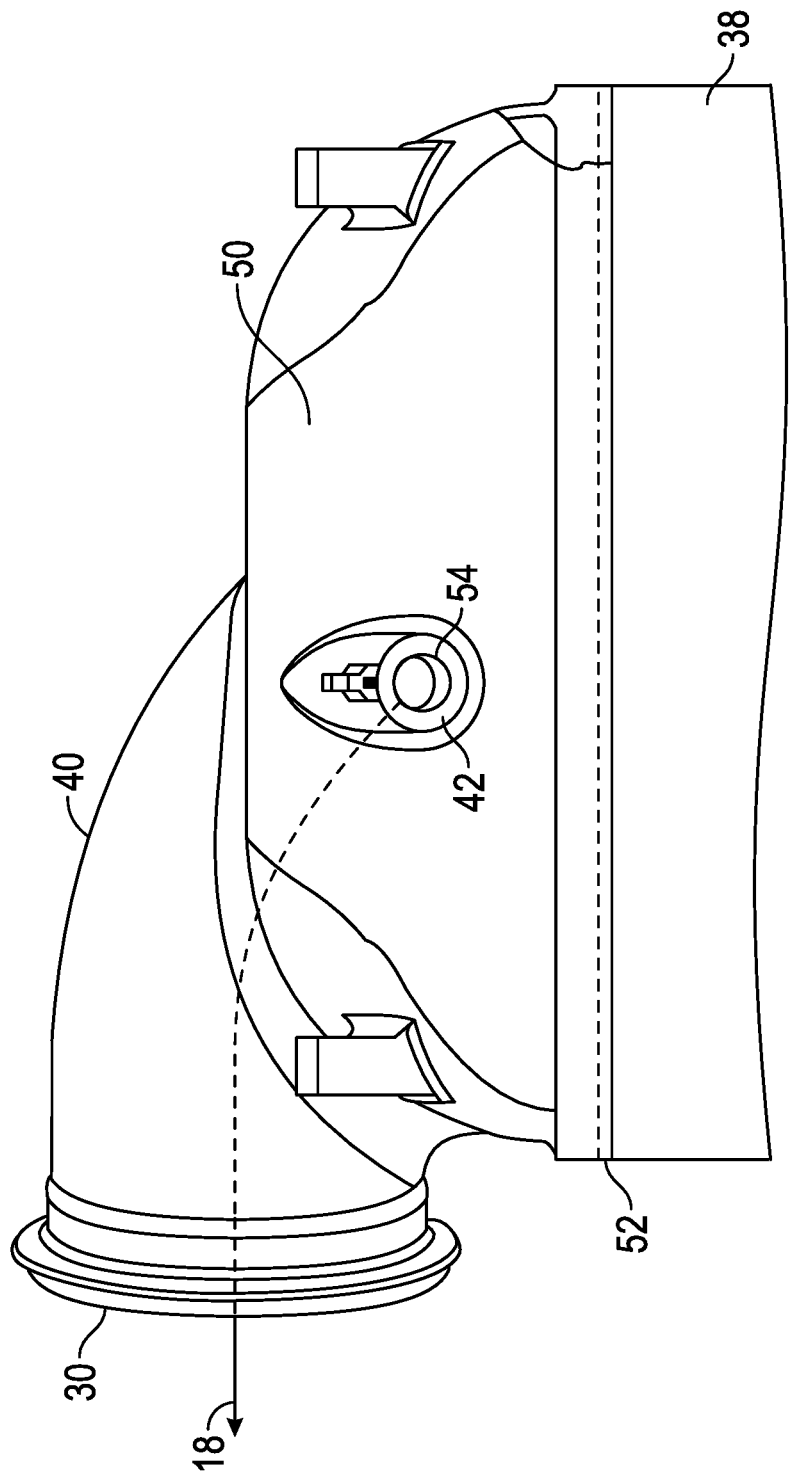
FIG. 4 is a partial side view of an embodiment of a precooler.
Figure 5:
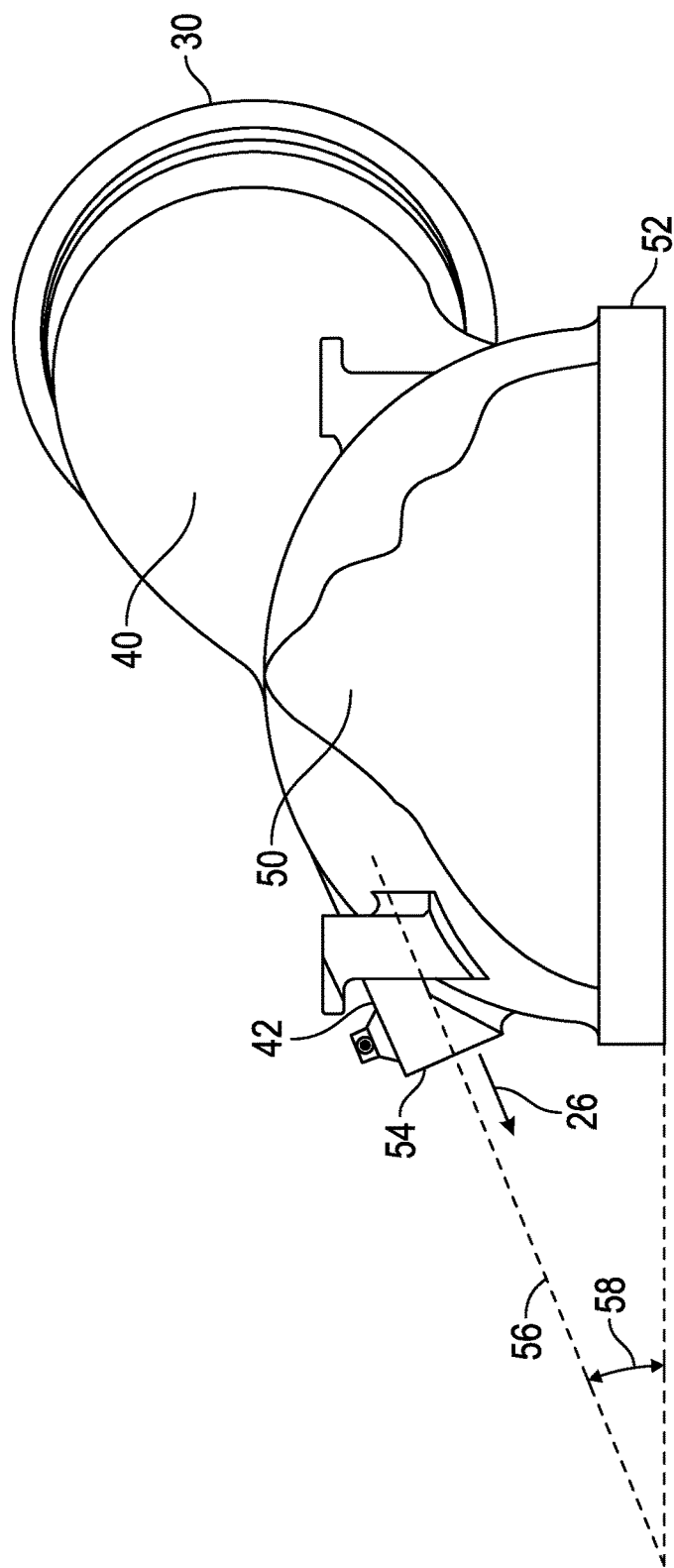
FIG. 5 is another partial side view of an embodiment of a precooler.
Figure 6:
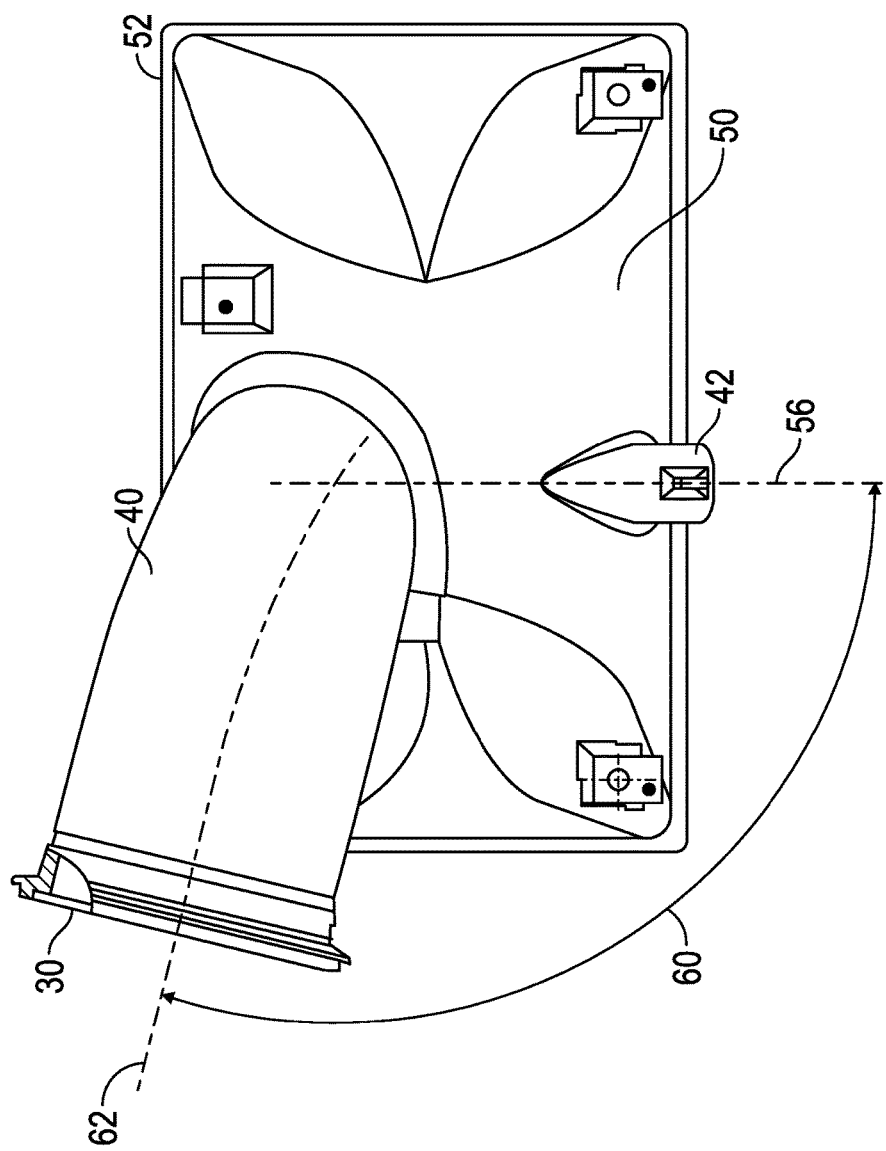
FIG. 6 is a partial plan view of an embodiment of a precooler.

Referring to FIGS. 4-6, and embodiment of a precooler 20 including a precooler bleed port 42 will be described in more detail. The precooler 20 includes the precooler core 38 and an outlet header 50 including the precooler bleed port 42 and the precooler outlet duct 40. The outlet header 50 is joined to the precooler core 38 at a planar mating face 52. The first outlet 30 of the compressor bleed flow 18 is located such that a precooler bleed outlet 54 of the precooler bleed port 42 is located between the first outlet 30 and the mating face 52. Further, referring to FIG. 5, a precooler bleed port axis 56 is orientated at a bleed port angle 58 to the mating face 52, such that the flow direction of the precooler bleed flow 26 is toward the mating face 52. In some embodiments, the bleed port angle 58 is in the range of 10 to 50 degrees. IN other embodiments, the bleed port angle is between about 20 to 25 degrees. In one embodiment the bleed port angle 58 is 22 degrees.

Referring now to FIG. 6, a plan view of the outlet header 50 is shown. A compressor bleed outlet angle 60 is defined between the precooler bleed port 42 and the first outlet 30. The compressor bleed outlet angle 60 is defined between a projection of the precooler bleed port axis 56 onto the mating face 52 and a projection of a precooler outlet duct axis 62 onto the mating face 52. In some embodiments, the compressor bleed outlet angle 60 is in the range of 90 to 180 degrees. In other embodiments, the compressor bleed outlet angle is between 100 and 105 degrees. In one embodiment, the compressor bleed outlet angle 60 is 103.5 degrees.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A precooler for an aircraft engine system comprising:
 a precooler core;
 a precooler inlet to direct a compressor bleed flow into the precooler core to cool the compressor bleed flow;
 a precooler outlet to direct the compressor bleed flow from the precooler to a selected component of the aircraft engine system and out of the precooler;
 a heat exchanger medium inlet;
 a heat exchanger medium outlet to direct a heat exchanger medium out of the precooler; and
 a precooler bleed port through which a portion of the compressor bleed flow is diverted to a secondary component of the aircraft engine system through a precooler bleed port outlet that is separate from the heat exchanger medium outlet and separate from the precooler outlet, wherein all of the flow diverted through the precooler bleed port exits the precooler through the bleed port outlet;
 wherein the precooler bleed port is oriented such that flow entering the precooler bleed port must substantially reverse direction from a direction of the compressor bleed flow through the precooler.

2. The precooler of claim 1, further comprising a precooler outlet header in which the precooler bleed port and the precooler outlet are disposed, the precooler outlet header joined to the precooler core at a planar mating face.

3. The precooler of claim 2, wherein the precooler bleed port is disposed between the precooler outlet and the mating face.

4. The precooler of claim 2, wherein a precooler bleed port axis is orientated at a bleed port angle to the mating face such that the flow through the precooler bleed port is toward the mating face.

5. The precooler of claim 4, wherein the bleed port angle is in the range of 10 to 50 degrees.

6. The precooler of claim 5, wherein the bleed port angle is 22 degrees.

7. The precooler of claim 4, wherein a compressor bleed outlet angle defined between between a projection of the precooler bleed port axis onto the mating face 52 and a projection of a precooler outlet axis onto the mating face is in the range of 90 to 180 degrees.

8. The precooler of claim 7, wherein the compressor bleed outlet angle is 103.5 degrees.

9. An aircraft engine system comprising:
 a compressor;
 a compressor bleed port to allow for extraction of a compressor bleed flow from the compressor;
 a precooler operably connected to the compressor including:
  a precooler core;
  a precooler inlet to direct the compressor bleed flow into the precooler core to cool the compressor bleed flow;
  a precooler outlet to direct the compressor bleed flow from the precooler to a selected component of the aircraft engine system and out of the precooler;
  a heat exchanger medium inlet;
  a heat exchanger medium outlet to direct a heat exchanger medium out of the precooler; and
  a precooler bleed port through which a portion of the compressor bleed flow is diverted to a secondary component of the aircraft engine system through a precooler bleed port outlet that is separate from the heat exchanger medium outlet and separate from the precooler outlet, wherein all of the flow diverted through the precooler bleed port exits the precooler through bleed port outlet;
  wherein the precooler bleed port is oriented such that flow entering the oriented such that flow entering the precooler bleed port must substantially reverse direction from a direction of the compressor bleed flow through the precooler.

10. The system of claim 9, further comprising a precooler outlet header in which the precooler bleed port and the precooler outlet are disposed, the precooler outlet header joined to the precooler core at a planar mating face.

11. The system of claim 10, wherein the precooler bleed port is disposed between the precooler outlet and the mating face.

12. The system of claim 10, wherein a precooler bleed port axis is orientated at a bleed port angle to the mating face such that the flow through the precooler bleed port is toward the mating face.

13. The system of claim 12, wherein the bleed port angle is in the range of 10 to 50 degrees.

14. The system of claim 13, wherein the bleed port angle is 22 degrees.

15. The system of claim 12, wherein a compressor bleed outlet angle defined between a projection of the precooler bleed port axis onto the mating face 52 and a projection of a precooler outlet axis onto the mating face is in the range of 90 to 180 degrees.

16. The system of claim 15, wherein the compressor bleed outlet angle is 103.5 degrees.

17. The system of claim 9, wherein the selected component is an engine control system.

18. The system of claim 9, wherein the secondary component is a fan air torque motor.

* * * * *